(12) United States Patent
Kursh (10) Patent No.: US 7,110,952 B2
(45) Date of Patent: Sep. 19, 2006

(54) COMPUTER ACCOUNTING METHOD USING NATURAL LANGUAGE SPEECH RECOGNITION

(76) Inventor: Steven R. Kursh, 210 Meadowbrook Rd., Weston, MA (US) 02493-2411

( * ) Notice: Subject to any disclaimer, the term of this patent is extended or adjusted under 35 U.S.C. 154(b) by 239 days.

(21) Appl. No.: 09/729,664

(22) Filed: Dec. 4, 2000

(65) Prior Publication Data

US 2001/0032076 A1    Oct. 18, 2001

Related U.S. Application Data (60) Provisional application No. 60/169,314, filed on Dec. 7, 1999.

(51) Int. Cl.
*G10L 21/06* (2006.01)
(52) U.S. Cl. .................... 704/270.1; 705/30
(58) Field of Classification Search ............. 704/257, 704/270, 246, 251, 270.1, 275; 705/11, 53, 705/8, 30–34, 38, 24; 386/69; 709/328; 702/188; 700/244; 379/210.01, 114.2; 340/825.25
See application file for complete search history.

(56) References Cited

U.S. PATENT DOCUMENTS

| | | | | |
|---|---|---|---|---|
| 4,192,006 A | * | 3/1980 | Hausdorff | 708/134 |
| 4,232,295 A | * | 11/1980 | McConnell | 340/825.25 |
| 4,852,000 A | | 7/1989 | Webb et al. | 364/406 |
| 4,947,028 A | * | 8/1990 | Gorog | 705/38 |
| 4,949,187 A | * | 8/1990 | Cohen | 386/69 |
| 5,247,575 A | * | 9/1993 | Sprague et al. | 705/53 |
| 5,383,112 A | * | 1/1995 | Clark | 705/8 |
| 5,463,685 A | * | 10/1995 | Gaechter et al. | 379/210.01 |
| 5,493,492 A | | 2/1996 | Cramer et al. | 364/406 |
| 5,510,606 A | | 4/1996 | Worthington et al. | 235/472 |
| 5,526,407 A | | 6/1996 | Russell et al. | 379/89 |
| 5,577,109 A | * | 11/1996 | Stimson et al. | 379/114.2 |
| 5,606,497 A | | 2/1997 | Cramer et al. | 395/232 |
| 5,625,749 A | | 4/1997 | Goldenthal et al. | 395/2.63 |
| 5,822,586 A | * | 10/1998 | Strutt et al. | 709/328 |
| 5,844,808 A | * | 12/1998 | Konsmo et al. | 700/244 |

(Continued)

FOREIGN PATENT DOCUMENTS

JP    2001-272987    * 10/2001

OTHER PUBLICATIONS

Apostolopoulos ("Accounting Management in Communication Networks: Concepts And Architecture", Proceedings., Second IEEE Symposium on Computers and Communications, Jul. 1997).*

(Continued)

*Primary Examiner*—Angela Armstrong
(74) *Attorney, Agent, or Firm*—Hamilton, Brook, Smith & Reynolds, P.C.

(57) ABSTRACT

A computer method is disclosed for the capture, tracking, and management of accounting data using natural language speech recognition with landline or wireless telephones. Information is stored in a central or peer-to-peer database, which in addition to the speech recognition interface, may be accessed using touchtone telephone menus; Personal Digital Assistants (PDAs); WAP, RIM and other. wireless protocol phones and devices; the Web; fax; email and other messaging protocols; synchronizable off-line applications; corporate financial systems; and distributed networks. In one form, the user initiates a telephone call and the invention confirms the user's identification, prompts the user for accounting information, records the information provided by the user into the appropriate database and language if the user's native tongue is different than that used by the accounting system, and provides to the user information in response to inquiries using natural language speech recognition.

16 Claims, 8 Drawing Sheets

U.S. PATENT DOCUMENTS

| | | | |
|---|---|---|---|
| 5,930,772 A * | 7/1999 | Gomyo et al. | 705/30 |
| 5,960,063 A * | 9/1999 | Kuroiwa et al. | 704/246 |
| 5,963,914 A * | 10/1999 | Skinner et al. | 705/11 |
| 5,991,742 A * | 11/1999 | Tran | 705/11 |
| 6,044,362 A | 3/2000 | Neely | 705/34 |
| 6,058,413 A | 5/2000 | Flores et al. | 709/101 |
| 6,064,929 A | 5/2000 | Migues et al. | 701/35 |
| 6,064,977 A | 5/2000 | Haverstock et al. | 705/9 |
| 6,101,473 A | 8/2000 | Scott et al. | 704/275 |
| 6,115,640 A | 9/2000 | Tarumi | 700/99 |
| 6,138,088 A | 10/2000 | Goeser | 704/9 |
| 6,144,938 A | 11/2000 | Surace et al. | 704/257 |
| 6,185,514 B1 * | 2/2001 | Skinner et al. | 702/188 |
| 6,721,716 B1 * | 4/2004 | Gross | 705/40 |

OTHER PUBLICATIONS

Failenschmid ("Spoken Dialogue System Design—The Influence Of The Organizational Context On The Design Process", IEEE 4th Workshop on Interactive Voice Technology for Telecommunications Applications, Sep. 1998).*

Colyer ("From Research to Reward: Challenges in Technology Transfer", International Conference on Software Engineering, Jan. 2000).*

* cited by examiner

COMPUTER ACCOUNTING METHOD USING NATURAL LANGUAGE SPEECH RECOGNITION

RELATED APPLICATION

This application claims the benefit of U.S. Provisional Application No. 60/169,314, filed on Dec. 7, 1999. The entire teachings of the above application are incorporated herein by reference.

BACKGROUND OF THE INVENTION

1. Field of the Invention

The present invention relates to the capture, tracking and management of accounting data using natural language speech recognition. The invention gives users the ability to perform in their native tongues business-related tasks that require accounting data using natural language speech recognition. These tasks include, but are not limited to, expense tracking, time tracking, purchase requisitions, and financial record keeping for tax purposes and internal reporting.

2. Description of the Related Art

Most accounting systems require users to enter and review data via a keyboard and personal computer into a database residing on a single computer or in a database shared by several users in a client-server network, an intranet, or over the Internet. Some systems enable users to choose the tool with which to enter information via keyboard, touchtone menus or a wireless interface, or some combination of these offerings, which are limited in scope and flexibility for the user. All of these data entry tools require a general understanding of computers and either keyboard or touchtone entry of information, resulting in limited accessibility and inefficient use of time for people traveling on business or physically removed from their normal working environments.

There has not been a speech recognition-based interface to any commercial accounting system. There is, accordingly, a desire for a natural language speech recognition interface in addition to PDA, wireless, online and offline interfaces to accounting data for such uses as timesheets, travel plans, purchase requisitions, and financial record keeping for tax purposes and internal reporting that can be easily customized by users to fit their specific needs.

SUMMARY OF THE INVENTION

The present invention meets the shortcomings of the prior art. In particular, the present invention provides significant time savings, ease of use, and flexibility for people who need to keep detailed records for expense tracking, time tracking, purchase requisitions, and financial record keeping for tax purposes and internal reporting time when traveling on business or physically removed from their normal working environments using a wireless or landline telephone.

In one embodiment of the present invention, a user may provide and access accounting data for the preparation of expense reports, timesheets, travel planning, purchase requisitions and financial record keeping for tax purposes and internal reporting using a variety of interfaces, including natural language speech recognition and touchtone menus on the telephone; PDAs; WAP, RIM, and other wireless-enabled devices; email and other messaging applications; fax; and offline synchronizable applications; and on the Web. The accounting data may also be linked directly to other accounting and financial systems, including payroll.

The invention includes key customizable elements, such as verification of the user, project, and associated confirmation. Also the invention automates the approval process using messaging or fax technologies, in order to streamline the approval of reports and other business-related documents. These documents and reports include, for example, expense reports, timesheets, travel plans, purchase requisitions and financial record keeping for tax purposes and internal reporting. In addition, the invention allows the user and other designed parties to establish business rules that, for example, instruct the invention to call the user or groups of users at specific times to encourage them to submit data, or enable users and their managers to approve submitted accounting data by exception.

Further, the invention includes an infrastructure for serving individually-targeted ads or internal corporate messages across all user interfaces. Individually targeted ads combined with the aggregate purchasing records of individuals provide significant value to advertisers wishing to reach these markets. Ads served on the telephone offer the option to connect with a representative of the advertising company or to send information to an advertiser in order to be contacted later. The invention has a telephone or telecommunications device that provides access to communications lines, one or more processors, one or more program storage devices connected to the processors, one or more speech recognition platforms, and computer readable code embodied in the program storage devices for processing and storage of the accounting data.

In one form, the user initiates a telephone call and the invention confirms the user's identification, prompts the user for accounting information and records the information vocally provided by the user into the appropriate database. If the user's native tongue is different than that used by the accounting system, the invention system records the information in the appropriate language. The invention also provides the user information in response to inquiries using natural language speech recognition. The user may choose both the voice the system uses to communicate with the user and the style or tone of voice with which the system speaks.

In the preferred embodiment, the invention method for maintaining accounting data includes the steps of providing a database for storing desired accounting data;

using an automated voice interface to the database over a communication line, prompting a user to enter accounting data by speaking (i.e., in a manner free of keyboarding, logging into a global network and/or intermediately transferring data), the voice interface receiving audible signals indicative of words spoken by the user in response to said prompting;

obtaining from the received audible signals certain accounting data corresponding to the words spoken by the user; and     storing the obtained certain accounting data in the database.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
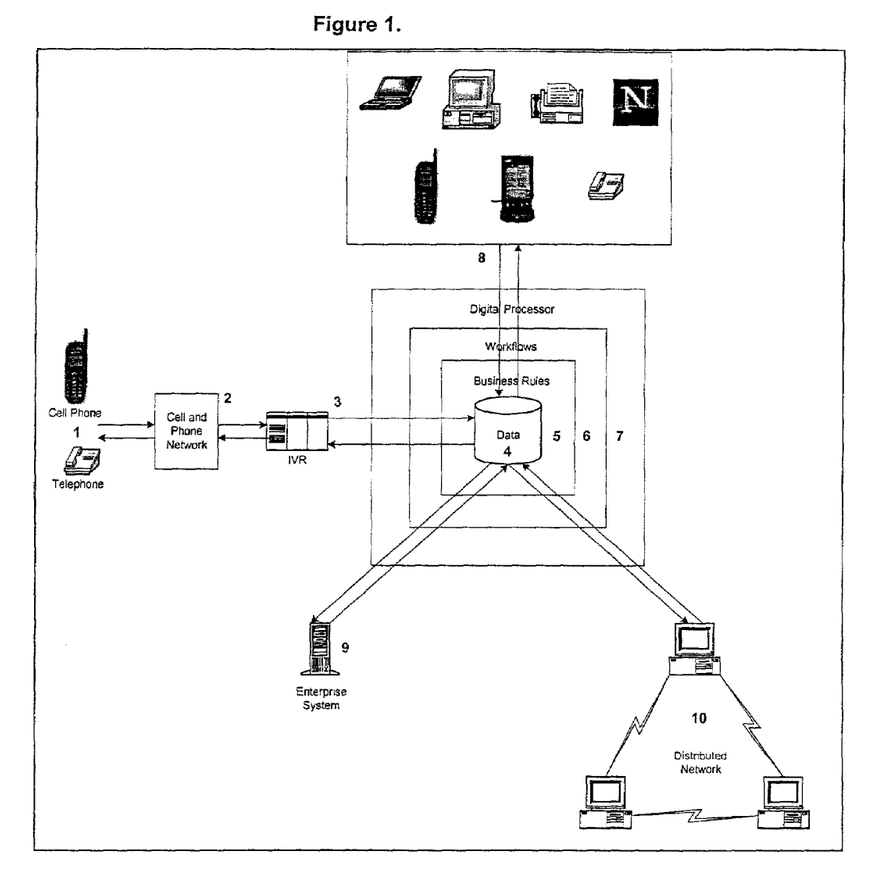
FIG. 1 is a system overview of the present invention.

Referring to FIG. 1, a wireless or land-based phone (1) serves as the primary interface to the database (4) for users. When a user calls a designated phone number, the call is connected through the wireless and/or phone network (2) to a computer hosting the Integrated Voice Response (hereafter IVR) platform (3). The natural language speech recognition system (at IVR platform 3) verifies the user's identity with the user's name and spoken password, or using speaker verification technology, by comparing the name and password combination with the account information stored in the database (4). In addition, if the user has registered the phone number he or she is calling from with the service, the IVR 3 recognizes the incoming phone number, and the user may log in simply by giving the correct password. Alternatively, the user may also input ID and password using touch-tone keys. Touch-tone response can also be used for all of the functions, operations, and capabilities listed below, but it will serve primarily as a backup system, if, for example, there is too much ambient noise or for privacy considerations. After a set number of unsuccessful attempts to enter ID and password, the system will disconnect the user.

After successful entering of user ID and password, the user may input a wide variety of accounting data related to expense reporting, timesheets, travel planning, purchase requisitions and financial record keeping for tax purposes and internal reporting, as well as review information, by using natural language speech utterances. The speech interface (3) includes a range of natural language prompts and protocols which guide users through the process of entering data by speaking. Speech interface 3 employs technology disclosed in (or similar to) U.S. Pat. Nos. 6,101,473; 5,960,063; 5,510,606; and 6,138,088. Thus the user enters data by speaking instead of keyboarding and in a manner free of the user logging onto a global network and free of intermediate transfer of data by the user.

The system 3 gives the user a chance to confirm that the system recognized the user's utterances correctly and offers help options that explain in detail the user's options at any given point in the workflow process. In addition to prompting users for information one data point at a time, the system 3 has the added benefit of allowing experienced users to speak in natural language sentences, containing multiple data attributes. For example, the user could say "$20 for parking on November 15 for the integration project." The system parses the utterance into its component attributes (i.e. Amount="$20," Date="November 15," Category="parking," and Project="integration project"), confirms them with the user, and then stores the data in the proper fields in the database 4. Users can sign up for the service in several different languages, and the information they enter over the phone in their native tongue can be automatically translated into another language by the system 3, in order to be sent to an accounting or financial system running in another language. Unless an administrator changes the permissions of the system 3, the user only has access to his or her own records. Information collected via the voice interface is stored in a database repository (4) for future access, reference, and manipulation.

The database (4) is designed with an open architecture that allows it to store and transfer data among the various components of the system; the voice, Web, fax and PDA interfaces 3, 8, client and financial systems 9,10, and other third party service providers 8. The database 4 stores all of the information collected through the voice, Web, fax and PDA interfaces 3,8 as well as the associated customized vocabularies needed for the voice and voice-Web interfaces. Access to specific information in the database 4 is controlled by a rules-based permissions system 5 (discussed later), so that each user group has access only to appropriate information. The database 4 is also linked to applications that translate faxed documents into data, applications that translate speech into data, and other applications that ensure seamless integration of all user interface options with client and financial systems, and the processing systems of third party service providers.

The invention includes flexible business rule options (5) that enable users to customize business rules on an individual, group, or corporate level. These business rules options include, for example, limits (e.g., maximums) on spending in certain categories, as well as approval-by-exception business rules that alert the approving manager only when certain parameters are not met. Business rules also determine what responses are acceptable (for example, the clients a user is authorized to bill against) when a user is entering information over the telephone or using another interface. Examples of some possible business rules contained in (5) are detailed below in an embodiment having an expense tracking application.

The invention includes flexible workflow management subsystem (6) that has options that are customizable on a user, group, or corporate level. These options, for example, enable a group of users or a company to automate the approval process for expenses, either using fax or email technology. In one configuration, a user directs the system to send an approving manager a copy of an expense report, either as a fax or as an email. Some examples of possible workflow management options the detailed below in the description of an embodiment of the invention as an expense tracking application.

The database (4), the business rules (5) and workflow management options and subsystem (6) which dictate how data is communicated between the IVR (3) and the database 4, are maintained and operated by digital processor (7) which serves as the primary engine of this invention. The digital processor controls the flow of data from the database and its related workflows 6 and business rules 5, to the IVR 3, which determines call flows, user options, grammars, and parameters for valid user responses; controls the flow of data from data queries from the user on the telephone; ensures that information that is input on the telephone is written correctly to the database 4, and provides interoperability with the other interfaces 8 available to the user.

Additional Interfaces for Output and Input of Data

In one form, the invention enables users to access data stored in the database repository 4, using a spectrum of other interfaces (8), in addition to the speech interface 1, 2, 3. These interfaces 8 also serve as channels of data output, for approval and authorization or reporting processes, defined by the business rules (5) and workflows (6) as defined by the user or some affiliated party. In addition, the system allows different levels of authorization and access, so that end users, managers, accounting and HR staff, clients, etc., can have access to specific subsets or supersets of information. The system provides users input and output access to data via the following means 8.

Web Browser

A user points the browser to his or her personalized site at server 7 hosting database 4 and subsystems 5, 6, and logs in using an ID and password combination. After a successful login, the user may perform the same functions listed in the voice interfaces 3, capturing, manipulating, and reviewing data regarding expense reports, timesheets, travel planning, purchase requisitions and financial record keeping for tax purposes and internal reporting. In contrast to the prompt-and-response-based exchange of information used in the voice interface 3, information is presented visually on the screen of a computer monitor. Users can also review data they have inputted via phone or any of the other user interfaces and make changes. All changes are captured and recorded for future audit trail review. The site (digital processor 7) includes some basic analysis tools to help users make the best use out of available data, as well as standard and customized reports, which can be delivered via any of the available interfaces to a manager, client, etc. The browser also allows the user to set and to change business rules 5 and workflow options 6. Information collected via the web browser interface 8 is stored in the database repository 4 for future access, reference, and manipulation. Users also have the option of using natural speech voice recognition technology to maneuver through and enter data into the web interface 8.

PDA

A user may perform the same functions on a PDA 8 listed in the voice interface 3, in capturing, manipulating, and reviewing data regarding expense reports, timesheets, travel planning and purchase requisition. A user may store information about expense reports, timesheets, travel plans, purchase requisitions and financial record keeping for tax purposes and internal reporting on software running on the PDA 8 itself, and synchronize the information contained on the PDA with the database 4 at a later time. Alternatively, using a wireless-enabled PDA, a user may capture, manipulate, and review data to and from the database 4 directly. Users may upload and generate reports (e.g., invoices, status reports) and other data using their PDAs, either by synching with their personal website (server 7) via a browser-connected computer or a direct modem connection, or through a wireless Internet connection. The process includes electronic signature capabilities that allow clients to store approval of expenses, invoices, payments, etc. on their PDAs and offload to the specified parties later.

Fax

A user may use fax technology 8 to export data in any specified report format, to any specified individual or destination. The user may initiate a fax using any of the other communications interfaces (phone, Web, PDA) 7, 8. For instance, using the natural language speech recognition interface 1, 2, 3, a user may direct the system to fax an expense report to his or her manager for approval.

Touchtone

The speech recognition interface 1, 2, 3 call flow has a parallel and simultaneously accessible touchtone call flow, which employs touchtone menus so that users may enter data without speaking. While these touchtone menus are completely functional, they are slower and more difficult to use than speech prompts, and they are meant to be used in the event of excessive ambient noise that does not allow the speech recognition platform 3 to work properly or for security purposes (for instance, entering a password without the need to say it in public).

Synchronizable Offline Application

The invention includes a software program that is installed on a desktop or laptop computer and runs "offline," without direct access to the database 4 for users who are only occasionally connected to the Internet. This program stores expense, time, travel planning, purchase requisition, and other financial data for tax purposes and record keeping, and it can be synchronized with the database 4 using an Internet connection 8. Each time the program is synchronized, the information stored in the offline program is updated with additional information in the database 4 at the same time that it sends its stored information to the database itself.

Email and Other Messaging Protocols

The invention enables users to store, track, and manage the workflow of expense, time, travel planning, purchase requisition, and data for financial record keeping for tax purposes and internal reporting using email and other messaging protocols 8. For instance, a user may send data into the database 4 via email or the user may send reports for approval to the user's manager.

Linkages With Enterprise Systems, Distributed Networks and Corporate Intranets

The database (4) is constructed with an open architecture designed to support the exchange of data between the database itself and other systems, such as enterprise systems (9), distributed networks (peer-to-peer) of computers (10), and corporate intranets. This allows information contained and tracked in the repository database 4 to be posted to the user's existing systems in the appropriate place and at the appropriate time. The timing and placement of such postings is controlled by the administrator, as invoices, payments, etc. often require managerial approval before they are posted to the system. The system's open architecture also allows users to populate the database 4 with necessary data from their own financial systems, avoiding double-entry of data. The user has complete control over these data flows and is aided by the customization capabilities of the workflow and business rules subsystems 6, 5.

Example Embodiment of the Invention as an Expense Tracking Application

The following is with reference to FIGS. 2–9 and describes an embodiment of the speech recognition-based portion of the invention as an expense tracking application. The figures and text describe the following features and functions in some detail:

A user logs into the system using a wireless or land-line telephone 1

Figure 2:
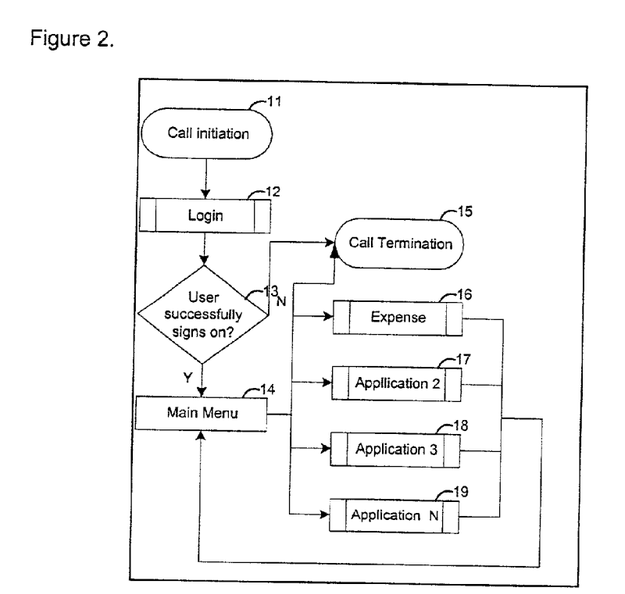
FIG. 2 is a flow diagram of the main menu at login of the system in FIG. 1.

The user chooses the expense application from a menu of options (FIG. 2)

Figure 4:
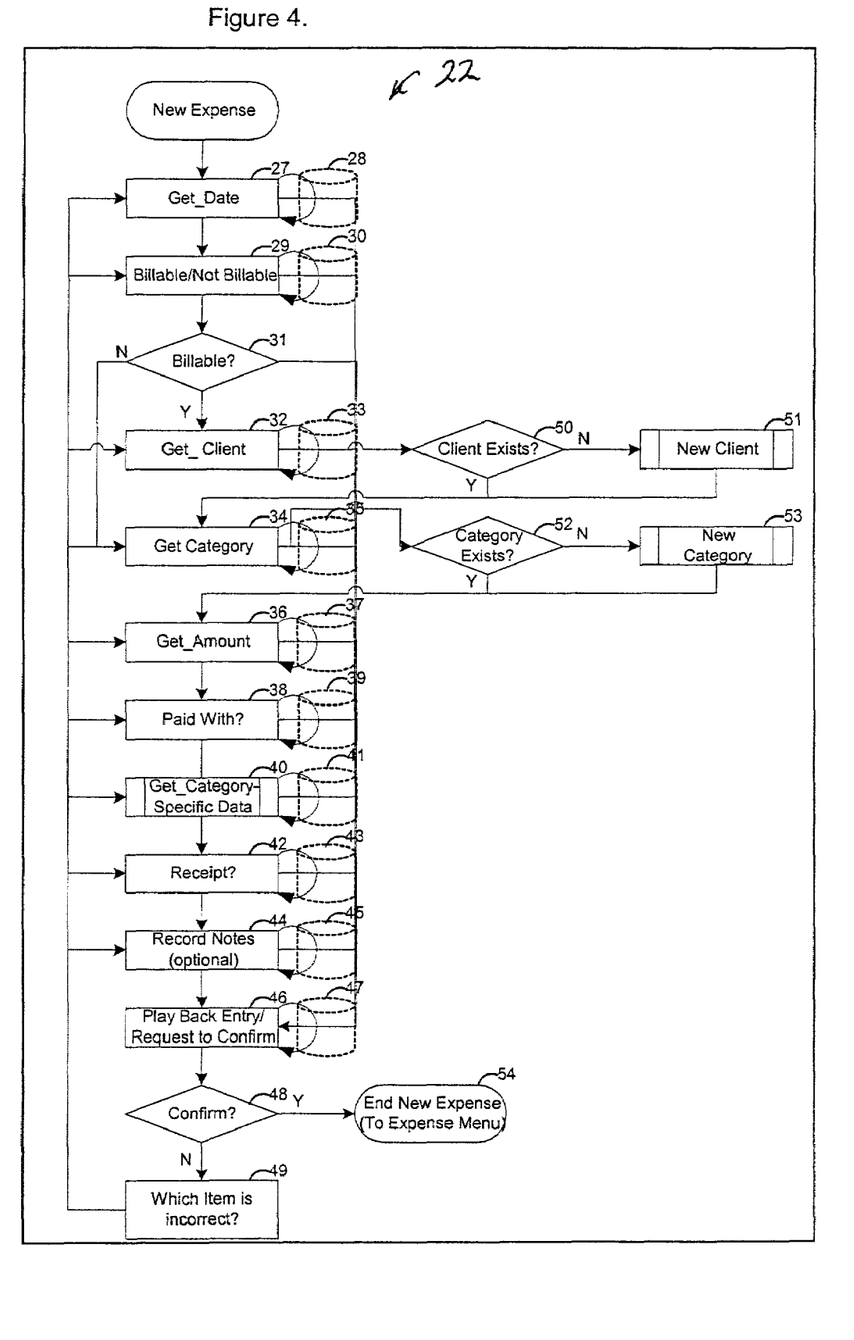

The user enters new expense items into the system using natural language and/or by following the prompts from the system (FIG. 4)

Figure 5:
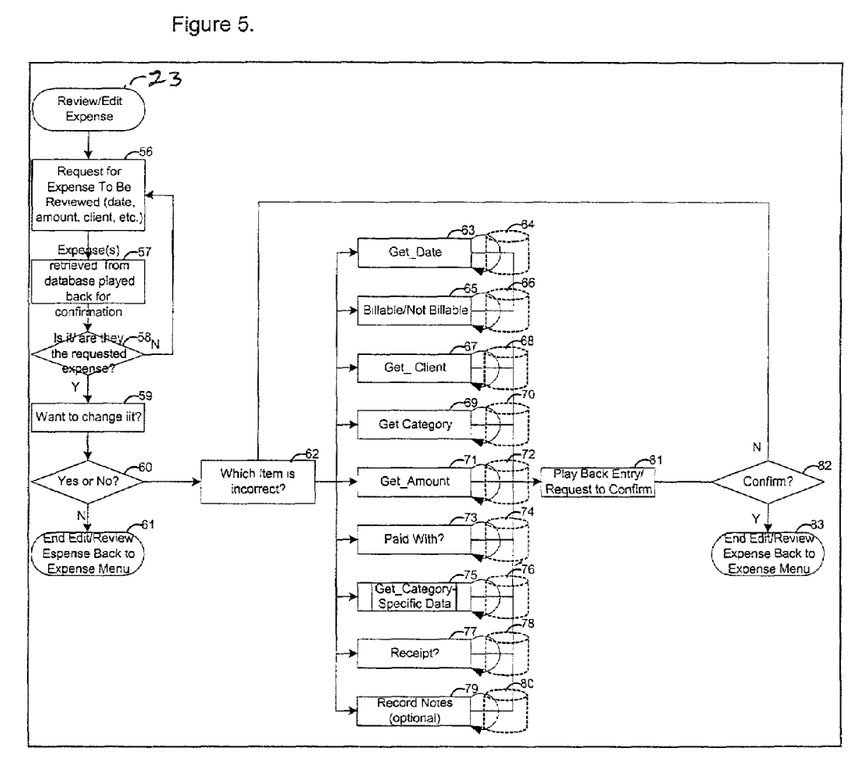

The user reviews and edits expense items already stored in the database 4 using natural language and/or by following the prompts from the system (FIG. 5)

Figure 6:
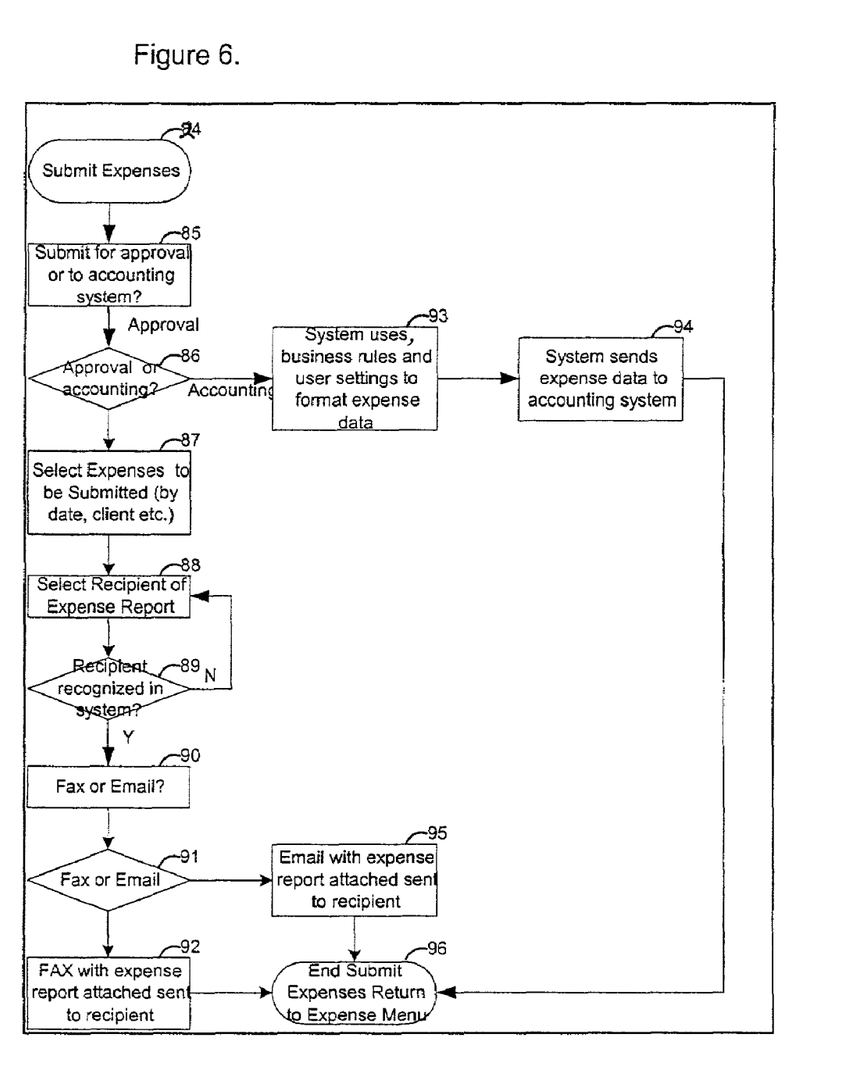

The user submits expense reports to a manager for approval, either via email or fax technology; and submits expense records into a corporate accounting or ERP system, both by using spoken commands over the telephone, as illustrated in FIG. 6.

Note that the invention includes additional features, functions, and applications that are not described herein; this description should serve only as an example of an embodiment of this invention.

Referring to FIG. 2, call initiation begins with step 11. The user initiates a call into the system, either using a land-based or wireless telephone 1, by dialing a designated telephone number, which connects to the system IVR 3 through the wireless or public telephone network 2.

In response to call initiation 11 (successful connection), the system prompts (step 12) the user to log into his or her account, with a User ID and Password. See steps 106–113 below in conjunction with FIG. 8 for a more detailed description of the login process 12.

At decision juncture 13, the system determines whether the user has successfully signed on. If the user logs in successfully, the system proceeds to the Main Menu 14, otherwise the call is terminated at 15 on the fourth unsuccessful attempt (See steps 106–113 of FIG. 8 below for further details).

Next the system asks the user what he or she would like to do, and then gives them the options of the Main Menu 14, which offers the users a choice as to which application they desire to use. The presently detailed embodiment includes an expense tracking application 16, as well as other applications, 17–19, which may include such applications as time tracking, travel planning, purchase requisitions, other business applications requiring financial record keeping for tax purposes or internal reporting. When the user verbally selects any of these options, he is sent to the appropriate application, which may reside on the same IVR 3 , the same group of IVR boxes 3 or entirely different IVR machines 3. In the case of the user saying "expenses", in response to the prompt in Main Menu 14, he or she is transferred to the Expense Application 16, described below in FIG. 3.

The Main Menu options of "Application 2" at 17 and "Application 3" at 18 in FIG. 2 represent a second and third application, respectively, available to the user. Each application varies by the user, and thus is not described in detail here, but may for example include time tracking, travel planning, purchase requisition, other business applications requiring financial record keeping for tax purposes or internal reporting. To illustrate that a multiplicity of such applications may be made available to the user, "Application N" at 19 is shown in FIG. 2 and represents N number of applications available to the user, which will vary by the user.

Figure 3:
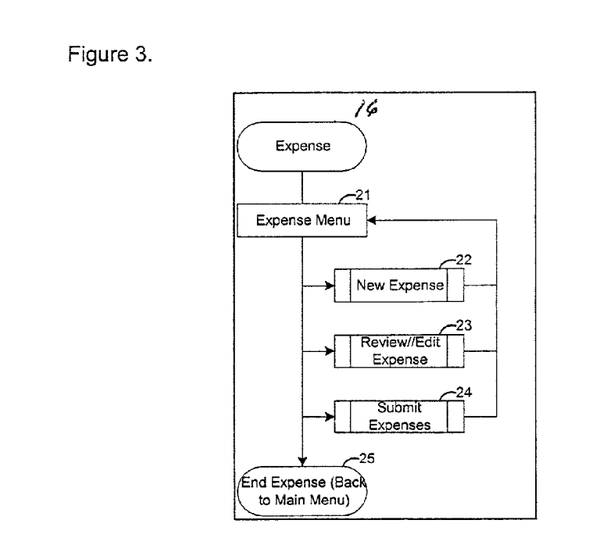
FIGS. 3–6 are flow diagrams of expense processing in the present invention system.

Referring to FIG. 3 is the expense tracking application 16, which the user enters through the login 12 and main menu 14 process of FIG. 2. In certain embodiments of the invention, the user only uses the system for one application, for example expense tracking, in which case the successful completion of the login process 12, 13 leads the user directly to the expense application 16.

After initialization, the expense application 16 displays or otherwise provides expense menu 21. This is the main menu for the expense application 16. The system 16 offers the user the choice of entering a new expense 22, reviewing and or editing expenses 23, submitting expenses 24, or other options, and the system initiates the appropriate process depending on the user's response to menu 21.

From the Expense Menu 21, if the user wants to enter new expense data, he or she says "new expense" or a similarly recognizable statement, and the system initiates the new expense entry process 22 and prompts the user through the necessary steps (detailed below) to making an expense entry.

From the Expense Menu 21, if the user wants to edit and/or review expense data, he or she says "edit expenses", "review expenses" or a similarly recognizable statement, and the system initiates the expense edit/review process 23, and prompts the user through the necessary steps for reviewing and/or editing expenses. Further details of the Review/Edit Expense process 23 follows below.

From the Expense Menu 21, if the user wants to submit expenses, for example to a supervisor or to the user's corporate accounting system, he or she says "submit expenses" or a similarly recognizable statement, and the system initiates the submit expense process 24, and prompts the user through the necessary steps for submitting expenses. See steps 85–96 (FIG. 6) for a detailed description of the Submit Expense process 24.

At any time in FIG. 3, the user may return to the main menu 21 of the application 16, using utterances such as "main menu". From Expense main menu 21, if the user says "END expense" or "Main Menu", then the system processes End Expense 25 and returns to main menu 14 of the initial login.

Illustrated in FIG. 4 is the flow diagram of the new expense process 22 as selected from Expense Menu 21 of FIG. 3.

The New Expense process enables 22 the user to enter new expense items, and is initiated through the Expense Menu 21, the main menu for the expense application 16.

First process 22 prompts the user (at Get_Date 27) for the date of the expense item the user wishes to record. The user may say the date in a variety of formats, (June 22, today, last Tuesday, etc.), and the Get_date part 27 of the system interprets the user's utterance into a standard date format. As described below, the database 4 may contain information or rules that limit or otherwise affect acceptable user responses.

At 28, a Get_Date Data database transaction occurs in response to the Get_Date 27 process results. The system pulls any settings, business rules, customized grammars, or other information contained in the database 4 which could limit or otherwise affect accepted responses. For example, users may be prohibited from entering expense items for dates in the future that have not yet arrived.

Next a Billable/Not Billable step 29 takes place. The system asks the user whether the expense is to be billed to a client, or is an internal expense. In response to user input here is a Billable/Not Billable database transaction 30. The system pulls any settings, business rules, customized grammars, or other information contained in the database 4 which could limit or otherwise affect acceptable user responses. For example, the user may set up his or her account so that all or no expenses are billed to a client, in which case the system may skip this prompt altogether.

At 31, process 22 determines whether the expense is to be treated as Billable. If the expense item is to be billed to a client, the system proceeds to 32, Get_Client. If not, the system proceeds to 34, Get_Category.

At 32, Get_Client prompts the user to say the name of the client to which the expense is associated. At 50 the system 22 compares the user's response with the users' clients as contained in the database 4, accessed as described in step 33. If the client as stated by the user is not currently in the user's list of clients, the system 22 proceeds to the new client module 51 (further detailed in FIG. 7), unless business rules are in place to prevent the user from creating additional clients.

At 33, a Get_Client database transaction pulls any settings, business rules, customized grammars, or other information contained in the database 4 which could limit or otherwise affect accepted responses, including the list of clients available to a particular user for billing expenses.

In the case where the expense is not to be billed to a client, Get_Category 34 prompts the user for the category of the expense. The system compares (step 52) the user's response with the expense categories associated with the user, which are contained in the database 4. A Get_Category 35 database transaction pulls any settings, business rules, customized grammars, or other information contained in the database 4 which could limit or otherwise affect accepted responses, including the list of expense categories available to a particular user. If the category is not on the user's list of available categories, the system proceeds to the new category module 53 further detailed in FIG. 9, unless business rules are in place to prevent the user from creating additional categories.

Proceeding with process 22 of FIG. 4, Get_Amount (step 36) prompts the user for the amount of the expense. The system is designed with an option that can be turned on and off (with settings transferred at 37), to take amounts in US$ as well as other currencies. At step 37, a Get_Amount database transaction pulls any settings, business rules, customized grammars, or other information contained in the database 4 which could limit or otherwise affect accepted responses. For example, business rules might be in place that set a maximum for lodging expenses; in this case the user will not be allowed to enter an amount greater than the maximum allowed.

At step 38, the system prompts the user for the method of payment of the expense (cash, credit cards, etc.). The system specifically identifies credit cards used for purchases, in order to match the expense details entered by users with secure electronic credit card feeds, containing their credit card purchase information. A Paid With? database transaction 39 pulls any settings, business rules, customized grammars, or other information contained in the database 4 which could limit or otherwise affect accepted responses, including the list payment types available to a particular user.

The process continues at step 40 with Get_Category-Specific_Data. Depending on the category identified in step 34, and the application settings, business rules, etc. from step 41, the user is asked for category-specific information, for example miles traveled for a mileage category expense. Many of these prompts can be turned on and off by the user depending on his or her needs. Accordingly, Get_Category-Specific_Data database transaction 41 pulls any settings, business rules, customized grammars, or other information contained in the database 4 which determine which if any category-specific prompts it asks, and likewise could limit or otherwise affect accepted responses.

At step 42, the system asks the user whether there is a receipt associated with the expense item, to which the user responds "yes" or no". This attribute is used when matching expense items in the database 4 to corporate credit card feeds or in matching entries with paper receipts. The Receipt? database transaction 43 pulls any settings, business rules, customized grammars, or other information contained in the database 4 which could limit or otherwise affect accepted responses. For example, users can turn the receipt prompt on or off, depending on whether they use this feature.

As an optional step, Record Notes 44 gives the user the opportunity to make a voice recording of any additional details about the expense item, not covered in the prompts above, to be stored as a way file or in another format in the database 4, and associated with the expense entry, for future reference. This can be turned on and off, as in step 45, and the system 22 also can be set to prompt the user to name for example, the names of people attending a lunch meeting, in this recording. The corresponding Record Notes database transaction 45 pulls any settings, business rules, customized grammars, or other information contained in the database 4 which could limit or otherwise affect accepted responses.

At Play Back Entry/Request to Confirm 46, the system plays back the information submitted by the user for the particular expense item, and then asks the user to confirm whether or not the information is correct. Corresponding database transaction Play Back Entry/Request to Confirm 47 pulls any settings, business rules, customized grammars, or other information contained in the database 4 which could limit or otherwise affect accepted responses.

If at the confirmation step 48, the user says that the entry is correct, the system proceeds to step 54, End New Expense. The system exits the new expense process 22, and returns to the Expense Menu 21 (FIG. 3). In one embodiment the system asks the user if he or she wishes to enter another new expense, in which case it returns to the beginning of New Expense 22 (FIG. 4).

If, at step 48 the user says the entry is not correct, the system proceeds to step 49 to determine which item is incorrect. In that case, the user is asked to specify which attribute or attributes of the expense item are incorrect, and if needed, lists the choices for the user. For simplicity, these diagrams assume that the user specified a single attribute to change; the user could specify more than one attribute to change, for example "client" and "amount", in which case the system prompts the user for each attribute in series.

Continuing in FIG. 3, the Review/Edit Expense process 23 is detailed in FIG. 5. This process 23 enables the user to review and/edit expense items, either individually or in specified groups (by date client, etc.), that he or she has previously entered into the system. Upon user selection of this process 23 with desired parameters (date, client, etc.) a Request for Expense To Be Reviewed specifying the user stated date, amount, client, etc. is generated at 56. In response to the generated request, matching/ corresponding expense(s) are retrieved from database 4, and played back for confirmation (step 57). That is, the system retrieves from the database 4 the information specified by the user in request 56, and plays it back to the user, asking for confirmation that it is the data the user intended to identify, and that not some other data, was retrieved.

If at 58 the user confirms that the data retrieved was the data the user intended to review, the system proceeds to step 59 Want to change it? If the system did not retrieve the correct data, it returns to step 56, where the user again is asked to identify the expense data to be retrieved.

At 59, the system 23 asks the user if he or she wishes to changed the expense item(s) retrieved in step 57. The example here assumes a single expense item was retrieved in step 57. If multiple items are requested and retrieved, the additional step of identifying which (or all) of the items are to be changed is necessary at 59.

If at 60 the user indicates that he or she wants to change the expense item, the system proceeds to step 62 to determine which item is incorrect. If not, the system proceeds to step 61, which ends the edit/review process 23, and returns to the expense menu 21 (FIG. 3).

At step 62, the user is asked to specify which attribute or attributes of the expense item are incorrect, and if needed, lists the choices for the user. For simplicity, these diagrams assume that the user specified a single attribute to change; the user could specify more than one attribute to change, for example "client" and "amount", in which case the system would prompt the user for each attribute in series.

Continuing at step 63, the system 23 prompts the user for the date of the expense item the user wishes to record. The user may say the date in a variety of formats, (June 22, today, last Tuesday, etc.), and the system 23 interprets the user's utterance into a standard date format. A Get_Date database transaction 64 pulls any settings, business rules, customized grammars, or other information contained in the database 4 which could limit or otherwise affect accepted responses.

Next, at step 65, the system 23 asks the user whether the expense is to be billed to a client, or is an internal expense. A corresponding Billable/Not Billable database transaction 66 pulls any settings, business rules, customized grammars, or other information contained in the database 4 which could limit or otherwise affect acceptable user responses. For example, the user may set up his or her account so that all or no expenses are billed to a client, in which case the system may skip this prompt altogether.

At step 67, the system 23 prompts the user to say the name of the client to which the expense is associated. The system compares the user's response with the users' clients as contained in the database 4, accessed by Get_Client database transaction 68. If the client as stated by the user is not currently in the user's list of clients, the system 23 proceeds to the new client module 51 (FIG. 7), unless business rules are in place to prevent the user from creating additional clients. That is, database transaction 68 pulls any settings, business rules, customized grammars, or other information contained in the database 4 which could limit or otherwise affect accepted responses, including the list of clients available to a particular user for billing expenses.

Similarly at step 69, process 23 prompts the user for the category of the expense. The system 23 compares the user's response with the expense categories associated with the user, which are contained in the database 4, accessed at 70. If the category is not on the user's list of available categories, the system 23 proceeds to the new category module 53 (FIG. 9), unless business rules are in place to prevent the user from creating additional categories. That is Get_Category database transaction 70 pulls any settings, business rules, customized grammars, or other information contained in the database 4 which could limit or otherwise affect accepted responses, including the list of expense categories available to a particular user.

Next at step 71, the system 23 prompts the user for the amount of the expense. The system 23 is designed with an option that can be turned on and off (with settings transferred in 72), to take amounts in US$ as well as other currencies. In Get_Amount database transaction 72, the system 23 pulls any settings, business rules, customized grammars, or other information contained in the database 4 which could limit or otherwise affect accepted responses. For example, business rules might be in place that set a maximum for lodging expenses; in this case the user will not be allowed to enter an amount greater than the maximum allowed.

Continuing at step 73, the system 23 prompts the user for the method of payment of the expense (cash, credit cards, etc.). The system 23 specifically identifies credit cards used for purchases, in order to match the expense details entered by users with secure electronic credit card feeds, containing their credit card purchase information. To accomplish this, Paid With? database transaction 74 pulls any settings, business rules, customized grammars, or other information contained in the database 4 which could limit or otherwise affect accepted responses, including the list payment types available to a particular user.

Depending on the category of the expense item, and the application settings, business rules, etc. from database transaction 76, the user is asked for category-specific information at step 75, for example miles traveled for a mileage category expense. Many of these prompts can be turned on and off by the user depending on his or her needs. The supporting Get_Category-Specific_Data database transaction 76 pulls any settings, business rules, customized grammars, or other information contained in the database 4 which determine which if any category-specific prompts it asks, and likewise could limit or otherwise affect accepted responses.

At step 77, the system 23 asks the user whether there is a receipt associated with the expense item, to which the user responds "yes" or no". This attribute is used when matching expense items in the database 4 to corporate credit card feeds or in matching entries with paper receipts. To assist with this step 77, Receipt database transaction 78 pulls any settings, business rules, customized grammars, or other information contained in the database 4 which could limit or otherwise affect accepted responses. For example, users can turn the receipt prompt on or off, depending on whether they use this feature.

At step 79, the system 23 gives the user the opportunity to make a voice recording of any additional details about the expense item, not covered in the prompts above. These voice notes are stored as a .wav file or in another format in the database 4, and associated with the expense entry, for future reference. This can be turned on and off, as in 80, and the system 23 also can be set to prompt the user to name for example, the names of people attending an expensed lunch meeting, in this recording. Accordingly, Record Notes database transaction 80 pulls any settings, business rules, customized grammars, or other information contained in the database 4 which could limit or otherwise affect accepted responses.

At this point 81, the system 23 plays back the expense entry with the modifications specified by the user in steps 63–80, and asks (step 82) the user to confirm that the modified entry is correct. If at step 82, the user responds that the entry is correct, the system proceeds to 83 to end Edit/Review Expense process 23, and returns to the Expense Menu 21 (FIG. 3). If not, the system 23 returns to step 62 to ask the user which attribute of the expense item is incorrect and processing repeats through steps 63–83 as described above.

The third option in Expense Menu 21 is to submit expenses 24. The expense submittal process 24 is detailed in FIG. 6 and discussed next.

The Submit Expenses process 24 enables the user to submit expense reports to supervisors, managers, or clients for approval, or to feed his or her expense information into a corporate accounting system. Included in this process 24 are numerous flexible workflow capabilities that streamline the approval and submittal process for users, their managers, clients, and accounting staff.

Beginning at step 85, the system 24 asks the user whether he or she wants to submit an expense report for approval, or send expense data to a corporate accounting system. Depending on the user settings pulled from the database 4, the user may have one or the other of these options disabled, if, for instance the user is not authorized to feed expense data directly to the accounting system. In addition, accounting staff at a company can upload expense information from all of their users by logging in with an ID and password with administrative authority.

If the user wishes to submit an expense report for approval, the system proceeds from decision juncture 86 to step 87 Select Expenses to be Submitted. If on the other hand the user wants to send data to a corporate accounting system, the system proceeds from decision 86 to step 93, System uses, business rules and user settings to format expense data discussed later.

In the former, Select Expenses to be Submitted 87, the system 24 asks the user to identify the expenses to be submitted. He or she can select expenses based on any of the criteria associated with an expense item, such as date incurred, client, expense category, payment type, etc. The system 24 tells the user how many items are selected, and at the user's request, can say each expense item, and then asks the user to confirm the expense selection(s).

Continuing at step 88, the system 24 asks the user to specify the recipient of the expense report defined in step 87. In the embodiment illustrated in FIG. 6, the user's list of possible recipients has previously been created online, so that the system 24 can pull all of the recipients' pertinent information from the database 4. In an alternative embodiment, the user may define recipients over the telephone as well. If the system 24 recognizes (step 89) the recipient specified by the user in step 88, it proceeds to step 90 Fax or Email?; if not, system 24 returns to step 88 to prompt the user to try and identify the recipient of the expense report again.

At step 90, the system 24 asks the user whether he or she wants to send the expense report to the recipient via email or fax. The user may select default settings for individual recipients, so that for example, the user's manager always receives a fax copy of the user's expense report. If the user selects to send the expense report via email at 91, the system proceeds to step 95. If at step 91 the user selects to send the expense report via fax, the system proceeds to step 92.

At step 92, the system 24 sends a fax of the expense sheet to the recipient's fax number. The report is prepared in a customized format as specified and controlled by the user online. After step 92, the expense submittal process 24 ends 96 and the system returns to Expense Menu 21 (FIG. 3).

In the case where the user selects (at step 91) to email the expense report, the system 24 sends the recipient an email with the expense report contained in the message and as an attachment (step 95). This embodiment of the invention also includes workflow capabilities that allow managers to approve expense reports electronically, by responding to a message containing an expense report, and including their electronic signature, which ensures that the manager approved the expense report, and that the report was not subsequently altered. After step 95, the system 24 ends the Submit Expenses process and returns 96 to the Expense Menu 21 (FIG. 3).

If at step 86, the user selected to send the expense data to a corporate accounting system, then the process 24 proceeds to step 93. At step 93, the system 24 uses business rules and user settings to format expense data. The invention includes data integration with a variety of corporate accounting and ERP systems, which is controlled by the user online through a series of business rules and settings. Continuing to step 94, the system 24 sends the expense data to the user's corporate accounting or ERP application, via FTP, a well-formed XML document, or another data transfer protocol. Then the system 24 ends 96 the Submit Expense process and returns to Expense Menu 21 (FIG. 3).

Figure 7:
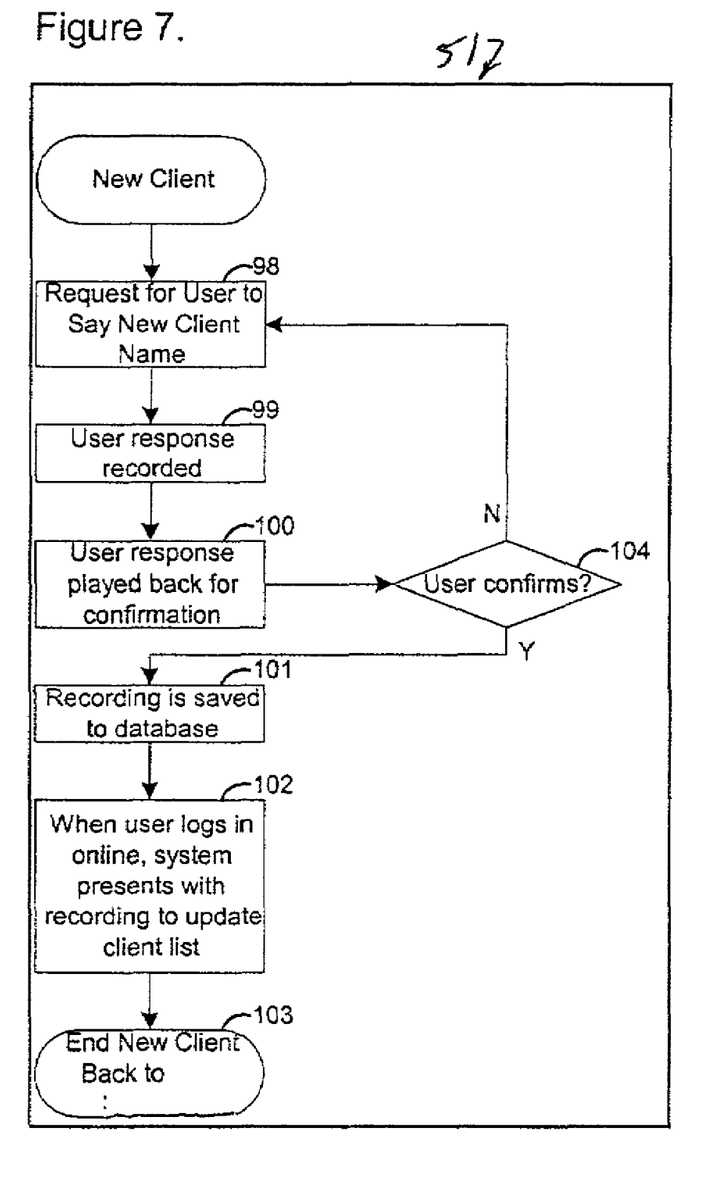
FIG. 7 is a flow diagram of a new client process.

As made reference to in step 51 of FIG. 4 and step 67 of FIG. 5, the process for obtaining a new client is illustrated in FIG. 7 discussed next.

If the user indicates that he or she wishes to bill an expense item to a new client not currently in the user's client list, or the system 16 determines that the client the user is attempting to bill to is not in the client list, the system 16 proceeds to the New Client process 51. In the first step 98, new client process 51 asks the user to say the name of the new client, in order to append the expense item with an audio marker indicating the name of the new client. Step 99 records the user's response. Step 100 plays back the recording made in step 99 to the user, to confirm the name of the new client.

If the user confirms, the system proceeds from decision 104 to step 101. If not, the system returns to step 98, and the user is again prompted to say the name of the new client.

At step 101, the .wav file recorded in step 99 and confirmed in step 100 is saved to the database 4, in association with the expense item it was intended for. Online, this field appears as a voice icon, where the user may play the .wav file by clicking on the icon. When a user logs in online, step 102 presents to the user a reminder to listen to the audio file recorded in step 99, and to update the client list, so that the new client can in the future be referenced directly by name by the user, just as the rest of the user's clients.

At step 103, the system leaves the New Client process 51 and returns to the appropriate step in the calling process.

Figure 8:
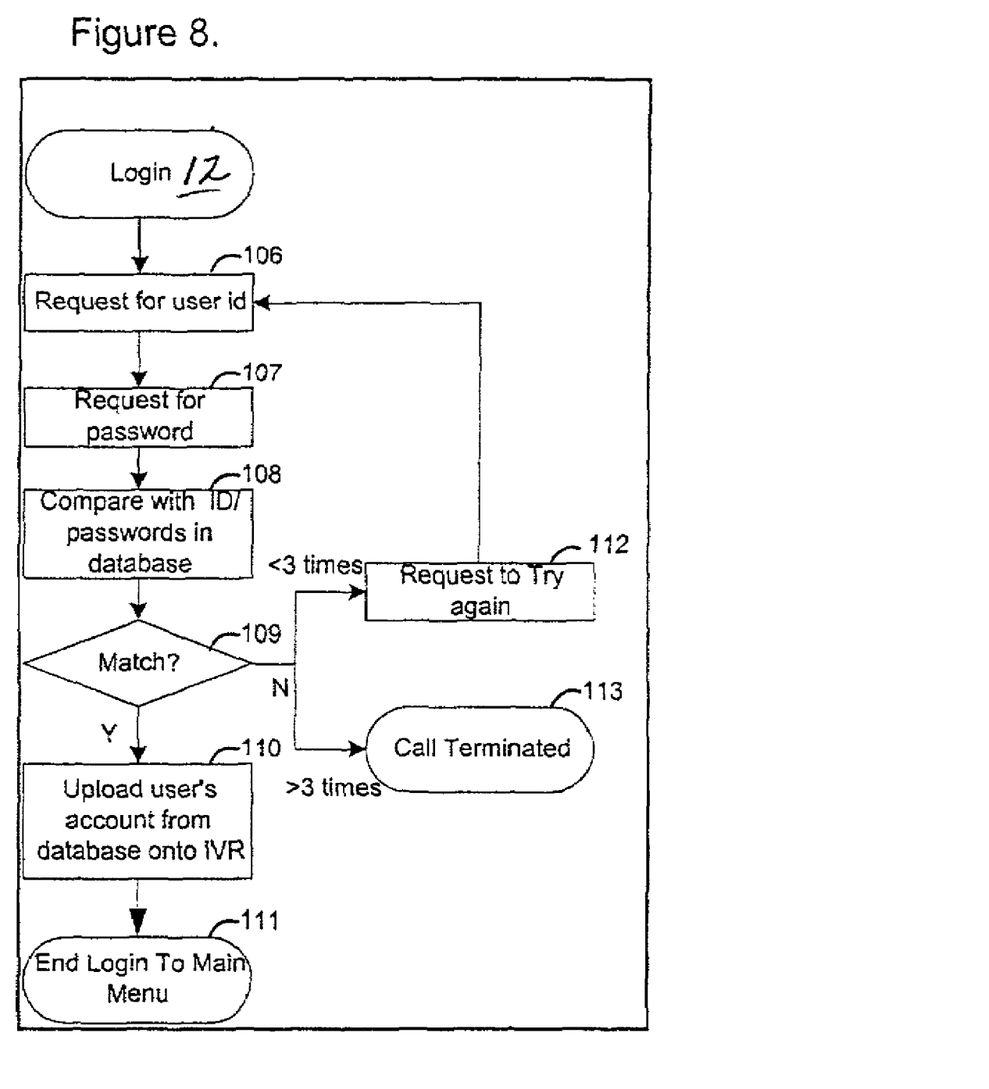
FIG. 8 is a flow diagram of the login process.

Mentioned in FIG. 2 is initial login process 12. This process 12 is illustrated in FIG. 8 and discussed below.

The user login process 12 is activated when a user calls into the system. At first step 106, the process 12 asks the user for his or her User ID. The system records and digitizes the user's response for comparison to the valid User ID-Password combinations in the database 4. As in all data entries, the user has the option of using DTMF menus to enter his or her User ID. Although inconvenient for many types of data entry by the user, using DTMF for the ID and Password helps preserve user privacy and security. In an alternative embodiment, the user may register his or her land and wireless phone numbers so that the system assumes calls from these specified numbers are originating from a particular user, and will skip to step 107, and request the user's password.

At step 107, the login process 12 asks the user for his or her Password. The system records and digitizes the user's response for comparison to the valid User ID-Password combinations in the database 4. As with all data entries by the user, the user may opt to use DTMF menus to enter his or her password. Although inconvenient for many types of data entry by the user, using DTMF for the ID and Password helps preserve user privacy and security.

At step 108, the login process 12 processes the user's ID and Password, accesses the valid ID-Password combinations, and compares them in order to decide whether or not to give the user access to the system. If a match (step 109) is found, then step 110 Uploads the user's account from database 4 onto IVR 3. Following user verification, the system 12 uploads the user's account information, including account-specific grammars, settings, and other information necessary to personalize the system in its interaction with the user. Once the login process is complete (step 111), the system presents the user with the main menu 14 of FIG. 2.

If no match is found at 109, then step 112 requests the user to try again. In particular, if the ID-Password combination is not valid, the system 12 tells the user that it couldn't verify the user's identity, and then reprompts for the User Id 101, and Password, 102. The login process 12 gives the user three attempts to log into the system, on the fourth unsuccessful attempt, the call is terminated (step 113). Login process 12 disconnects the phone call on the fourth unsuccessful login attempt (step 113).

Figure 9:
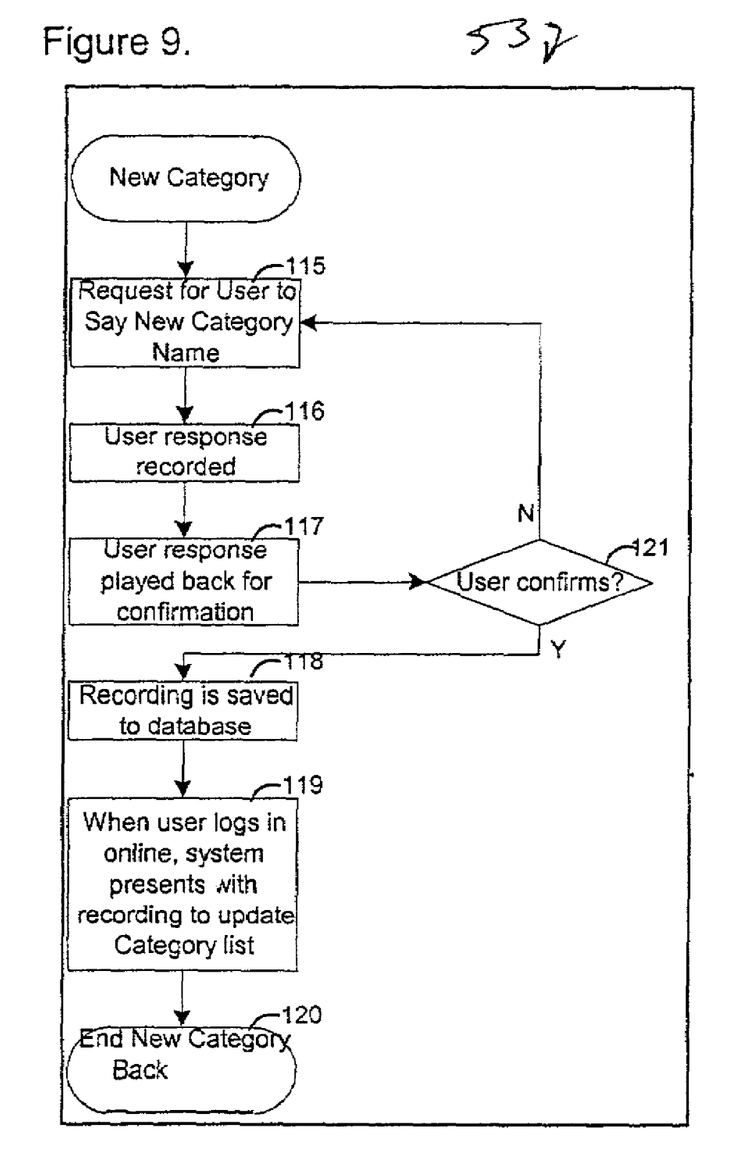
FIG. 9 is a flow diagram of a new category process.

In the above discussion of FIGS. 4 and 5, reference is made to a New Category process 53. If the user indicates that he or she wishes to add a new expense category or tries to use a category not currently in the user's list, or the system determines that the category the user is attempting to bill to is not in the client list, the system proceeds to the New Category process 53 (FIG. 9). As illustrated in FIG. 9, New Category process 53 first (step 115) asks the user to say the name of the new category, in order to append the expense item with an audio marker indicating the name of the new category.

Step 116 records the user's response. At step 117, the process 53 plays back the recording made at step 116 to the user, to confirm the name of the new category.

If the user confirms (at step 121) the new category recording, the system 53 proceeds to step 118. In step 118, the .wav file recorded in 116 and confirmed in 117 is saved to the database 4, in association with the expense item it was intended for. Online, this field appears as a voice icon, where the user may play the .wav file by clicking on the icon. When a user logs in online, the online application is designed such that step 119 reminds the user to listen to the audio file recorded in 116, and update the category list, so that the new category can in the future be referenced directly by name by the user, just as the rest of the user's expense categories. New Category process 53 ends at 120 and returns to the calling process.

If at step 121, the user does not confirm the name of the new category, then process 53 prompts the user to say the new category name (step 115) again, and steps 116–120 follow accordingly.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for maintaining accounting data comprising the computer implemented steps of:
   (a) providing a database for storing desired accounting data;
   (b) calling, by telephone, a user so as to begin a telephone call to receive certain accounting data to store to the database;
   (c) using an automated voice interface to the database during the telephone call, for spoken communication by the user, over a communication line, prompting the user to enter said certain accounting data primarily by speaking into a phone connected to the telephone call using natural language speech utterances (i) instead of the user keyboarding (ii) instead of requiring the user to log onto a global network and (iii) in effectively a direct, spoken manner instead of intermediate transfer of data by the user, the voice interface receiving audible signals indicative of words spoken by the user into the phone in response to said prompting;
      wherein said prompting includes (i) asking the user to confirm information and/or (ii) prompting for information one data point at a time, such that the step of prompting provides an exchange of information between the user and the database;
   (d) obtaining from the received audible signals certain accounting data corresponding to the words spoken by the user into the phone;
   (e) storing the obtained certain accounting data in the database; and
   (f) serving an individually targeted message to the user through the phone over the communication line, said individually targeted message having contents unrelated to any of status of the telephone call and account status of the telephone call.

2. A method as claimed in claim 1 wherein the communication line is a wireless or land telephone network.

3. A method as claimed in claim 1 wherein the automated voice interface is computer implemented.

4. A method as claimed in claim 1 further comprising the step of automatically providing accounting data stored in the database to another user.

5. A method as claimed in claim 4 wherein the step of automatically providing includes providing the accounting data as a function of predefined rules.

6. A method as claimed in claim 1 wherein the desired accounting data includes length of time, dates, project identifier, type of expense, and the database stores desired accounting data in corresponding data fields.

7. A method as claimed in claim 1 further comprising the step of retrieving or editing accounting data from the database using the automated voice interface.

8. A method as claimed in claim 1 wherein if the words spoken by the user into the phone are in one language and the database stores accounting data in another language, then the steps of prompting and storing include translating between the one language and said another language.

9. A method for maintaining accounting data of time and expenses on respective projects, comprising the computer implemented steps of:
   (a) providing a database for storing desired accounting data;
   (b) calling, by telephone, a user so as to begin a telephone call and using an automated voice interface to the database during said telephone call, for spoken communication by a user, over a communication line, prompting the user to enter project accounting data to store to the database by speaking into a phone connected to the telephone call using natural language speech utterances instead of (1) the user keyboarding, (2) the user being required to log into a global network and (3) intermediate transfer of data by the user, the voice interface receiving audible signals indicative of words spoken by the user into the phone in response to said prompting;
      wherein said prompting includes at least one of (i) asking the user to confirm information and (ii) prompting for information one data point at a time, such that the step of prompting provides an exchange of information between the user and the database;
   (c) obtaining from the received audible signals certain project accounting data to store to the database corresponding to the words spoken by the user into the phone;
   (d) storing the obtained certain project accounting data in the database to enable tracking and reporting of time, events and expenses corresponding to the obtained project accounting data; and
   (e) serving an individually targeted message to the user over the communication line, the individually targeted message having contents unrelated to any of status of the telephone call and account status of the telephone call.

10. A method as claimed in claim 9 wherein the automated voice interface is computer implemented.

11. A method as claimed in claim 9 further comprising the step of automatically providing accounting data stored in the database to another user.

12. A method as claimed in claim 11 wherein the step of automatically providing includes providing the accounting data as a function of predefined rules.

13. A method as claimed in claim 9 wherein the desired accounting data includes length of time, dates, project identifier, type of expense, and the database stores desired accounting data in corresponding data fields.

14. A method as claimed in claim 9 further comprising the step of retrieving or editing accounting data from the database using the automated voice interface.

15. A method as claimed in claim 9 wherein the communication line is a wireless or land telephone network.

16. A method as claimed in claim 9 wherein if the words spoken by the user into the phone are in one language and the database stores accounting data in another language, then the steps of prompting and storing include translating between the one language and said another language.

* * * * *